United States Patent
Koo et al.

(10) Patent No.: US 6,519,337 B1
(45) Date of Patent: Feb. 11, 2003

(54) METHOD FOR SEARCHING TRUNKS IN TELECOMMUNICATION N/WS

(75) Inventors: Jin Mo Koo, Uiwang-shi (KR); Hong Yoon Kim, Suwan-shi (KR)

(73) Assignee: LG Electronics, Seoul (KR)

( * ) Notice: Subject to any disclaimer, the term of this patent is extended or adjusted under 35 U.S.C. 154(b) by 0 days.

(21) Appl. No.: 09/303,607

(22) Filed: May 3, 1999

(30) Foreign Application Priority Data

Sep. 3, 1998 (KR) ............................................. 98-36689

(51) Int. Cl.$^7$ ................................................. H04M 3/00
(52) U.S. Cl. .................. 379/333; 379/137; 379/220.01; 379/221.01; 379/337; 379/279
(58) Field of Search ................................. 379/133, 137, 379/138, 211.01, 220.01, 221.01, 221.03, 221.04, 269, 272, 273, 274, 275, 277, 279, 333, 337

(56) References Cited

U.S. PATENT DOCUMENTS

| | | | |
|---|---|---|---|
| 3,576,398 A | * | 4/1971 | Dejean et al. ............... 379/137 |
| 3,760,118 A | * | 9/1973 | Horenkamp et al. ......... 379/384 |
| 4,012,597 A | | 3/1977 | Lynk, Jr. et al. |
| 4,577,066 A | | 3/1986 | Bimonte et al. |
| 4,991,204 A | * | 2/1991 | Yamamoto et al. ..... 379/221.01 |
| 5,359,649 A | | 10/1994 | Rosu et al. |
| 5,856,981 A | * | 1/1999 | Voelker ....................... 714/712 |

* cited by examiner

Primary Examiner—Ahmad F. Matar
Assistant Examiner—Bing Bui
(74) Attorney, Agent, or Firm—McKenna Long & Aldridge LLP

(57) ABSTRACT

The present invention relates to a method for searching trunks in exchange systems that a subsystem searches a standby idle trunk for preparing a next trunk usage, stores information of the standby idle trunk and then processes a current call service by connecting the preset trunk when the call is required, whereby minimizing load of the system as well as improving a search speed of the trunk. The exchange system applied to the present system is composed of a subscriber call processing unit, a number decoding unit, a routing control unit, and a plurality of switching subsystems. The present invention has advantages to prevent the processor load from increasing according to the call processing as well as improve the system stability efficiently.

21 Claims, 5 Drawing Sheets

METHOD FOR SEARCHING TRUNKS IN TELECOMMUNICATION N/WS

BACKGROUND OF THE INVENTION

1. Field of the Invention

The present invention relates to a method for searching trunks in an exchange system. The exchange system has a distributed control structure for distributively accommodating the trunks to several subsystems which control routing to trunks. In this exchange system, the present invention particularly relates to a method for searching trunks that a subsystem searches a standby idle trunk for preparing a next trunk usage, stores information of the standby idle trunk and then processes a current call service by connecting the preset trunk when the call is required, whereby minimizing load of the system as well as improving a search speed of the trunk.

2. Background of the Related Art

Interoffice trunk line connection among telecommunications N/Ws composed of a plurality of exchanges systems, is carried out in a switching subsystem for controlling a respective trunk. The switching subsystem connects a call to trunks which are selected by whether the respective trunk may serve or not according to the trunk state, such as failure or call service state. And the switching subsystem is established by a trunk distributed control structure, which divides calls in each trunk group and allocates calls to each trunk group.

There is now described about a usual trunk allocating method. In order to set a speech path from an originating exchange to a terminating exchange, a corresponding switching subsystem searches each trunk state in its trunk group when requiring a trunk allocation to a plurality of switching subsystems in the terminating exchange. In case that there is no idle trunk in the corresponding trunk group, the corresponding switching subsystem moves a call service into another switching subsystem in the same trunk group. The another switching subsystem processes searching state of each trunk about a corresponding trunk group, repeatedly.

In other words, the switching subsystem receiving request of the trunk allocation in the exchange system, searches each trunk state of its trunk group and processes a call service through a corresponding idle trunk in case that there is the idle trunk, i.e. a trunk which is able to serve.

However, there are possibilities to have severe problems, for example interruption of overall services in a corresponding exchange system because system load raises continuously as busy hour call attempts (BHCA) in the corresponding exchange system, increased referring to FIG. 1.

Because of searching all trunks repeatedly regardless of each trunk state in a corresponding trunk group whenever a call is generated, it causes a call process to be delayed. In addition, it may raise load during processing the call by searching the trunk state unnecessarily in case that there is no idle trunk in a corresponding trunk group in the conventional trunk allocating method.

SUMMARY

Accordingly, in order to solve the problems in the prior art, it is an object of the present invention to provide a trunk search method by searching an idle trunk in a corresponding trunk group in an exchange system, setting the searched information, and then connecting the preset idle trunk as soon as a call is required, resulting in processing a call service quickly.

In one embodiment of the present invention to achieve the object, a method for searching trunks by a plurality of switching subsystems in an exchange system having a distributed control structure for distributing the trunks to the switching subsystems, the method comprising searching a first idle trunk for a required call service in a corresponding trunk group, searching a second idle trunk in the trunk group, setting the second idle trunk as an idle trunk standby information (SCHP; SearCH Pointer value) for preparing a next call service, and storing the information.

In another embodiment of the present invention to achieve the object, a method for searching trunks by a plurality of switching subsystems in an exchange system having a distributed control structure for distributing the trunks to the switching subsystems, the method comprising allocating the trunk by searching an idle trunk in a corresponding trunk group in accordance with a trunk allocation request and then setting an idle trunk information for a current call service, and allocating a standby trunk by searching another idle trunk in the trunk group in accordance with the trunk allocation request and then setting an idle trunk standby information (SCHP value) for a next call service.

In the other embodiment of the present invention to achieve the object, a method for searching trunks by a plurality of switching subsystems in an exchange system having a distributed control structure for distributing the trunks to the switching subsystems, the method comprising searching whether there is an idle trunk in a trunk group in accordance with a trunk allocation request, setting the searched idle trunk as an idle trunk information for a current call service in case that there is the idle trunk in the corresponding trunk group, searching whether there is another idle trunk in the trunk group, setting another searched idle trunk as an idle trunk standby information for a next call service in case that there is another idle trunk in the trunk group, and processing the current call service by using the idle trunk set in the idle trunk information.

BRIEF DESCRIPTION

Other objects, features and advantages of the present invention will become more apparent from the following detailed description when read in conjunction with the accompanying drawings, in which;

FIG. 1 shows a graph indicating a system load in accordance with BHCA in the prior art, FIG. 2 shows a block diagram of an exchange system applied to the present invention, FIG. 3 shows a detailed diagram indicating a trunk searching process in a switching subsystem of FIG. 2, FIG. 4 shows a flow chart of a trunk search method in accordance with one embodiment of the present invention, FIG. 5 shows a flow chart of a trunk search method in accordance with another embodiment of the present invention, FIG. 6 shows a graph indicating a system load in accordance with BHCA in the present invention, and FIG. 7 shows a graph indicating a system load when all trunks have failure state in an exchange system applied to the present invention.

DETAILED DESCRIPTION OF THE PREFERRED EMBODIMENTS

Embodiments of the invention will be described with reference to FIGS. 2 to 7.

An exchange system applied to the present system is composed of a subscriber call processing unit 21, a number decoding unit 22, a routing control unit 23, and a plurality of switching subsystems 24-1~24-n, as shown in FIG. 2. The subscriber call processing unit 21 processes a subscriber call service and provides a terminating telephone number, called by the calling subscriber to the number decoding unit 22. The number decoding unit 22 analyses the terminating telephone number and reports another call process information to the routing control unit 23 in case that another call process of a calling subscriber is required through another interoffice exchange system. The routing control unit 23 manages the plurality of switching subsystems 24-1~24-n by using the distributed control manner and requests a trunk allocation to a proper switching subsystem depending on a state information about a respective switching subsystems 24-1~24-n for processing the requested call service. Though not shown in the figure, the respective switching subsystem 24-1~24-n, have a plurality of trunk groups connected to other exchange systems respectively and include memory (RAM) for storing state information of each trunk group, and processor for searching trunks of the present invention, and so on.

FIG. 3 is a flow chart showing a trunk search method in accordance with one embodiment of the present invention. The switching subsystems 24-1, 24-2, 24-3 have 4 trunk groups respectively and 4 trunk group tables (memory) G1, G2, G3, G4 store state information about each of the trunk groups respectively. And each trunk group table stores a SearCH Pointer (SCHP) of instructing that there is an idle trunk of the trunk group in each group table. The SCHP value is set as an identification number (ID) of each idle trunk according to a searching result. In case that there is no idle trunk, the SCHP should be set as a default value (for example, "−1" is set in the present invention).

Referring to the trunk group table G1 of the switching subsystem 24-1 in FIG. 3, a trunk line state of the trunk group G1 is that No. 1 and 2 are BUSY (on service), No. 3 and 4 are MBLK (manual blocking state limited by an operator), No. 5 and 6 are FBLK (fault blocking state caused by H/W failure), and No. 7 and 8 are DELT (no connection card). When SCHP is "−1", there is no idle trunk line. In case that the trunk group G1 of the switching subsystem 24-1 receives a trunk request signal from the trunk routing control unit having the distributed control manner, the switching subsystem 24-1 determines that there is no idle trunk and sends the trunk request signal to a trunk group G1 of a switching subsystem 24-2. The switching subsystem 24-2 also determines that there is no idle trunk and sends the trunk request signal to a trunk group G1 of a switching subsystem 24-3. The switching subsystem 24-3 then sets a routing by connecting another exchange system to a respective trunk through an idle trunk line No. 4 and processes a call service because SCHP of the switching subsystem 24-3 is "4".

It will be now explained how to search trunk by using the SCHP referring to FIGS. 4 and 5.

FIG. 4 shows a flow chart of a trunk search method in accordance with one embodiment of the present invention. It shows a trunk search operation of a switching subsystem when the trunk is requested to occupy the trunk for processing the call.

To serve the call with a called subscriber which is dialed by a calling subscriber in case of routing with another exchange system through a trunk, a routing control unit 23 (referring to FIG. 3) sends a trunk allocation request signal TARS to a switching subsystem 24-1 by using a trunk group information about the respective switching subsystem (S400).

The switching subsystem 24-1 receiving the TARS looks for a serving trunk group for connecting with a called subscriber and searches that there is an idle trunk in the trunk group (S402). A processor (not shown) of the switching subsystem 24-1 reads a SCHP of a trunk group G1's table, searches whether there is an idle trunk or not, and identifies the ID of the idle trunk.

In case that there is an idle trunk (i.e., SCHP has a value except "−1"), the processor chooses an idle trunk having the ID which corresponds to a SCHP of a corresponding trunk group, as a current trunk (CURR_TRK=SCHP), and prepares a current call service through the current trunk (S404).

And then, the processor increases a SCHP value to search a next trunk state for preparing a next call service being requested (for example, SCHP←SCHP+1) (S410). In other words, the processor determines whether the trunk state is idle or not by checking a next trunk call state as increasing one by one from a trunk next the current trunk (S412). In case that the trunk state is idle, the processor determines whether the trunk is normal by checking a failure state (S414).

In case that the chosen trunk state is not idle or normal as a result of determining, the processor sets the SCHP as a next trunk (S416) and then determines whether the next trunk may serve or not the call by returning to S412 (S412, S414). In these ways, it repeatedly carries out the S412, S414, and S416 until the processor finds an idle and normal trunk. Hereinwith, a processing sequence of S412, S414 is changeable each other.

In case that the chosen trunk state is idle and normal, an ID of the next trunk is set as a SCHP of a corresponding trunk group G1 (S420). It is determined whether there is an idle trunk in a corresponding trunk group by checking the set SCHP value and carries out a next call service through a corresponding idle trunk line quickly. It is assumed that the SCHP value is set as a certain value "−1" in case that there is no idle trunk after searching all trunks of the corresponding trunk group.

In other embodiment, a next trunk search sequence is changeable to minimize a searching time, such as from first trunk line of a corresponding trunk group to next, or from any trunk line as a random order.

Back to S420 in FIG. 4, the current call service is processed through the current trunk chosen in the S404 by passing through the S422 after setting the next trunk for the next call service as the SCHP value. Like this way, it may serve a next call by using a SCHP during processing a current call service, by setting the SCHP value after searching an idle trunk for a next call service before the current call is processed.

Besides, in case that the SCHP is "−1" in S402, the processor of the switching subsystem 24-1 identifies whether there is a next switching subsystem in the same trunk group G1 (S430).

In case that there is the next switching subsystem in the same trunk group G1, the current call service is processed in the corresponding next switching subsystem (S432). The next switching subsystem carries out the above processes repeatedly. Otherwise, the call service is terminated by determining that the current call service is not processed (S434).

FIG. 5 is a flow chart showing a trunk search method in accordance with another embodiment of the present invention.

When a certain process is carried out in a switching subsystem, a certain trunk is recognized as an idle trunk. For example, in case of call release (S500), serving trunk recovering (S510), failure trunk restoration (S520) and trunk generation or addition (S530), the switching subsystem determines whether there is an idle trunk by reading a SCHP value of a trunk group, which includes the corresponding released, recovered, restored, and generated or added trunk (S540). In case that there is an idle trunk (i.e., the SCHP is not "−1"), the process is finished. In case that there is no idle trunk (i.e., the SCHP is "−1"), the released (S500), recovered (S510), restored (S520) and generated or added (S530) corresponding trunk ID is reset as the SCHP value (S550).

The exchange system of the described present invention manages a plurality of switching subsystems according to the distributed control way, and each of switching subsystem resets a SCHP value for processing a next call service during its control in FIG. 4 and/or FIG.5.

In other words, the switching subsystem searches another idle and normal trunk for preparing a next call service which is generated whenever it searches the trunk of each trunk group, and then resets the idle trunk's ID as a SCHP value. Thereby, the switching subsystem processes the next call service by using the idle trunk corresponding to the reset SCHP. In addition to, in case that there is no idle trunk, the switching subsystem sets the released, recovered, restored and generated or added corresponding trunk ID as the SCHP value. Thereby, the switching subsystem may connect an idle trunk for a next call service and process the call service, quickly.

Figure 1:
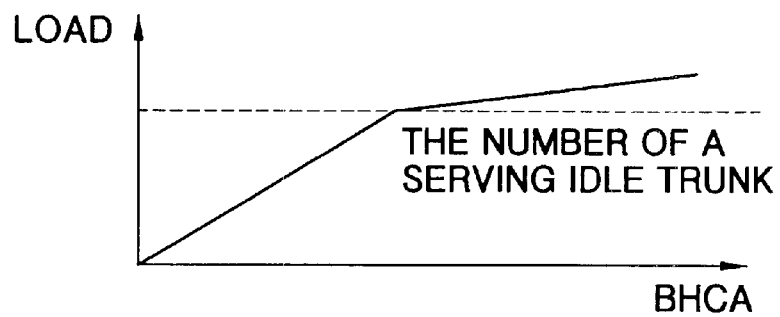
Figure 2:
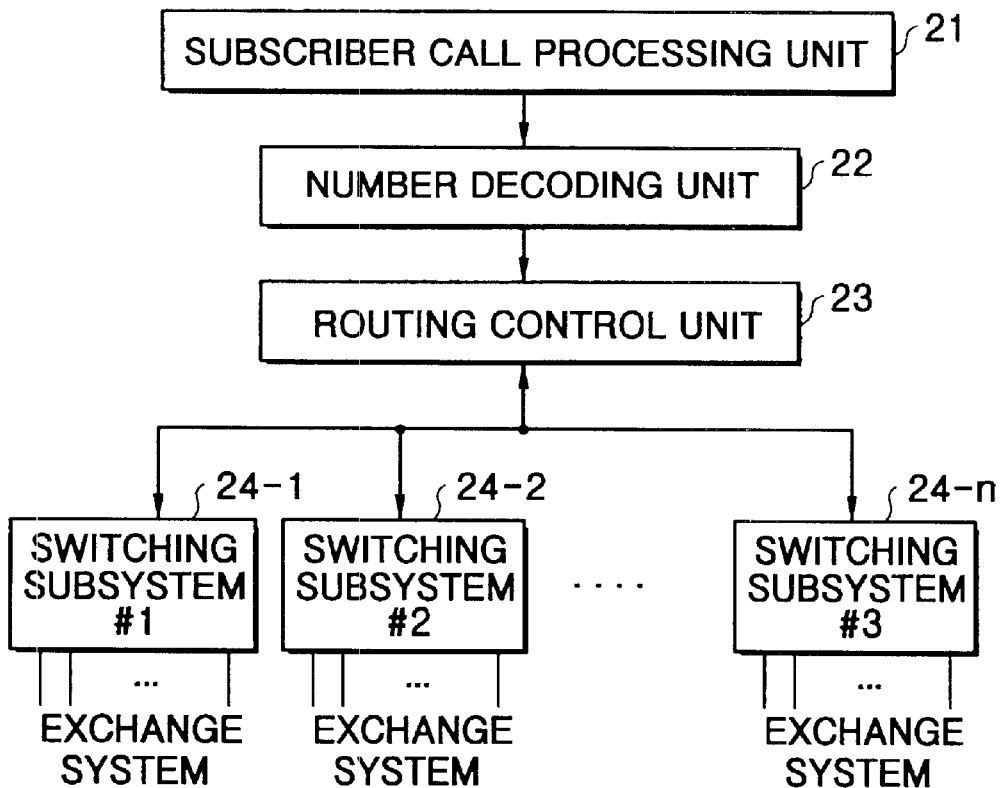
Figure 3:
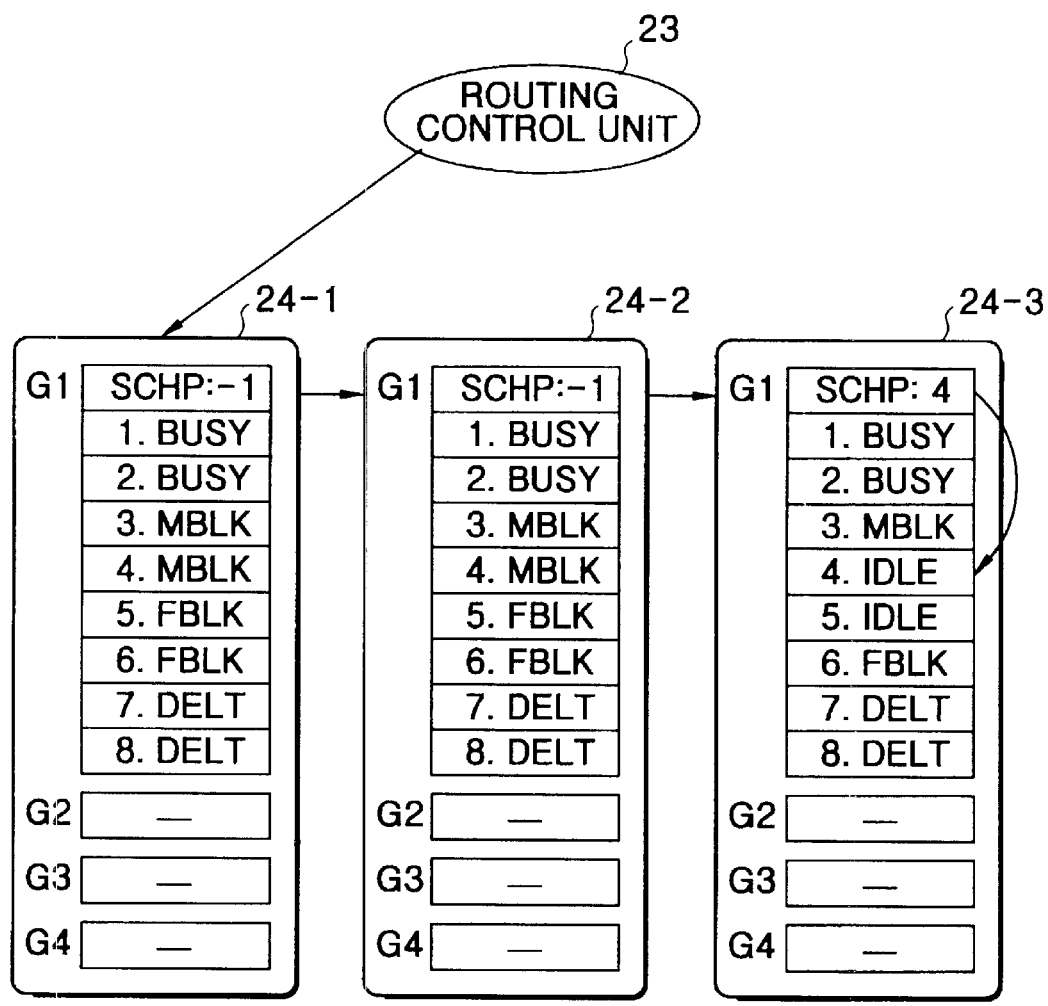
Figure 4:
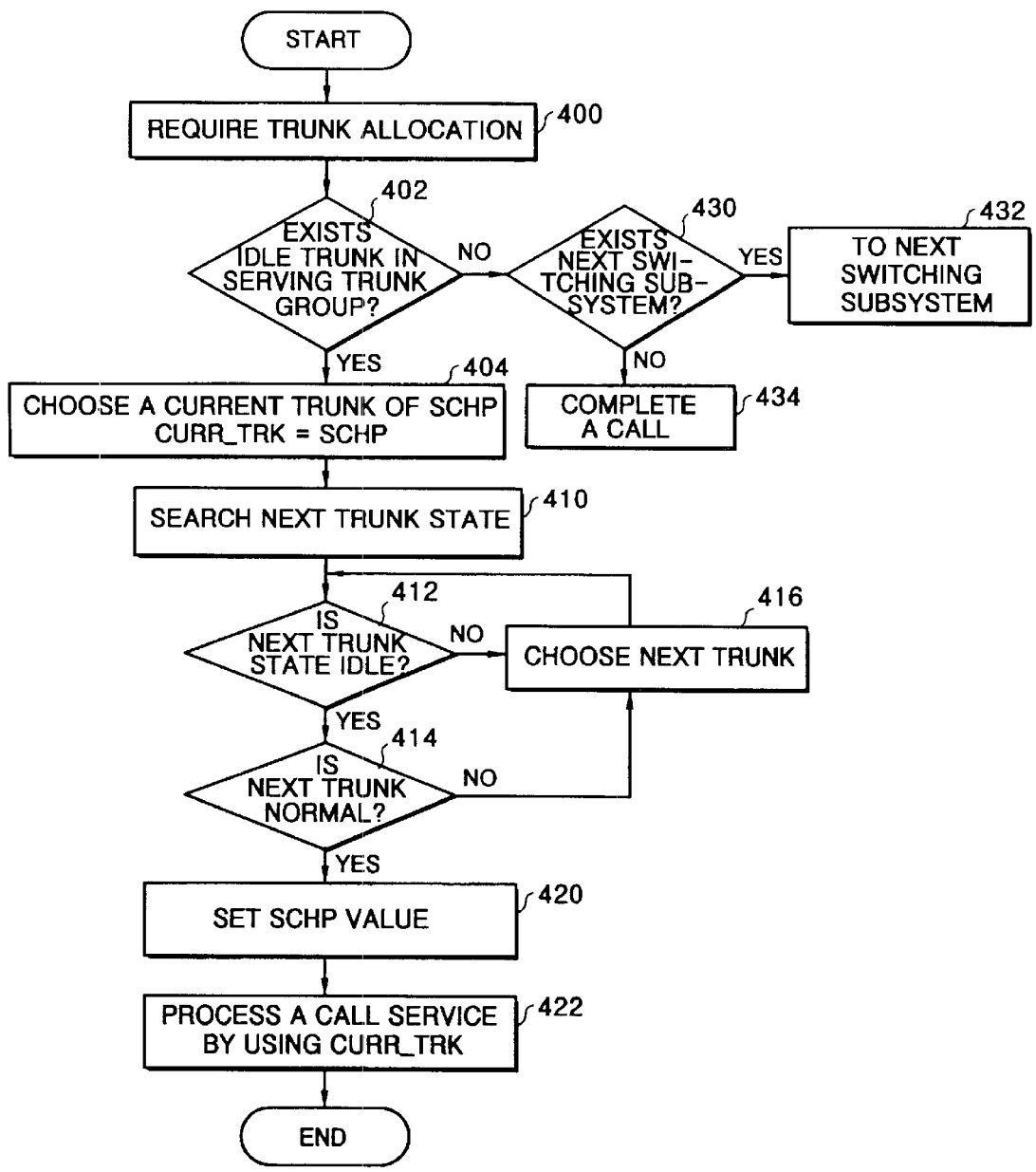
Figure 5:
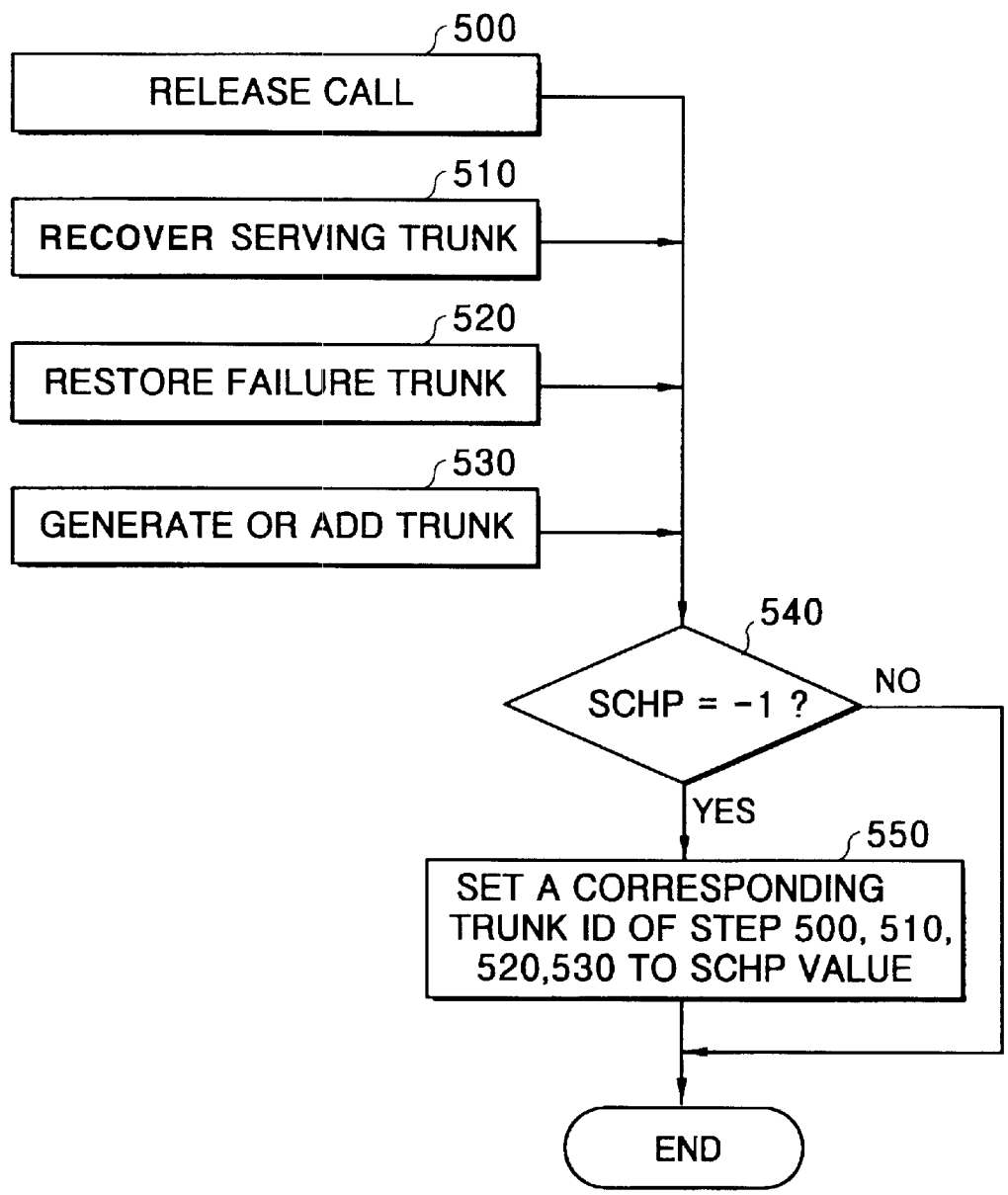
Figure 6:
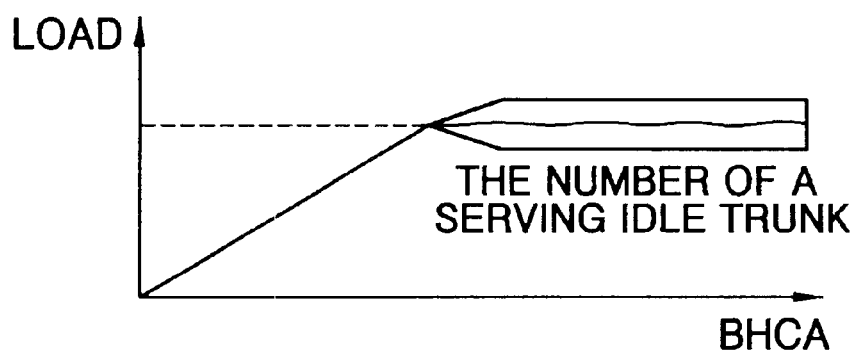
FIG. 6 shows a graph indicating a system load in accordance with BHCA in the present invention. Even through the BHCA increases, the load of the exchange system does not increase any more near the number of a serving idle trunk indicated with a dashed line when the failure state is not serious.
Figure 7:
FIG. 7 shows a graph indicating that a system load does not increase, when all trunks have failure state in an exchange system applied to the present invention.

The exchange system processes the call service and searches the trunk by using the idle trunk information (SCHP) about each trunk group, thereby it is not required to search an extra idle trunk for a next call service even though the next call service is required during the current call service. And the exchange system does not search for the trunk line which does not have an idle trunk line. Accordingly, the present invention has advantages to prevent the processor load from increasing according to the call processing as well as improve the system stability efficiently.

The present invention is not limited to the specifically disclosed embodiments, and variations and modifications may be made without departing from the scope of the present invention.

What is claimed is:

1. A method for searching trunks in an exchange system having a distributed control structure for distributing the trunks to a plurality of switching subsystems, comprising:
   searching whether there is an idle trunk in a trunk group for a requested call by reading a trunk group table when the call is requested to the switching subsystem, and then preparing a call processing service through the idle trunk;
   searching a standby idle trunk in the trunk group for being used when the next call is requested;
   setting information for the standby idle trunk as an idle trunk standby information; and
   storing the idle trunk standby information in the trunk group table.

2. The method of claim 1, further comprising:
   supervising whether there is a recovered trunk by being released a call during service in the trunk group, in case that there is no standby idle trunk in the trunk group; and
   resetting a recovered trunk identified number (ID) as the idle trunk standby information.

3. The method of claim 1, further comprising:
   supervising whether there is a generated trunk by being restored a failure trunk, or/and by being added a new trunk in the trunk group, in case that there is no standby idle trunk in the trunk group; and
   resetting a generated trunk ID as the idle trunk standby information.

4. The method of claim 1, wherein the idle trunk standby information is a search pointer (SCHP) of instructing whether there is the standby idle trunk in the trunk group, and the SCHP is set as an ID of the standby idle trunk according to a searching result.

5. The method of claim 1, wherein searching whether there is the idle trunk comprises:
   reading the idle trunk standby information stored in the trunk group table; and
   determining whether there is the idle trunk in the trunk group according to the idle trunk standby information.

6. The method of claim 5, wherein searching whether there is the idle trunk further comprises:
   identifying whether there is the next switching subsystem in the same trunk group, in case that there is no idle trunk in the trunk group; and
   moving the call processing service to the next switching subsystem immediately.

7. A method for searching trunks in an exchange system having a distributed control structure for distributing the trunks to a plurality of switching subsystems, comprising:
   allocating the trunk by reading a trunk group table and searching whether there is an idle trunk in a trunk group in accordance with a trunk allocation request to the switching subsystem, and by setting an idle trunk information for a current call service through an allocated trunk;
   allocating a standby trunk by searching another idle trunk in the trunk group for being used to the next trunk allocation request, by setting information for another idle trunk as an idle trunk standby information, and by storing the idle trunk standby information in the trunk group table.

8. The method of claim 7, wherein the idle trunk standby information is a search pointer (SCHP) of instructing whether there is the idle trunk in the trunk group, and the SCHP is set as an identified number (ID) of the idle trunk.

9. The method of claim 7, wherein allocating the trunk comprises:
   reading the idle trunk standby information stored in the trunk group table; and
   determining whether there is the idle trunk in the trunk group according to the idle trunk standby information.

10. The method of claim 7, wherein allocating the trunk further comprises:
    identifying whether there is the next switching subsystem in the same trunk group, in case that there is no idle trunk in the trunk group; and
    moving the call processing service to the next switching subsystem immediately.

11. The method of claim 7, wherein allocating the standby trunk comprises:

supervising whether there is a recovered trunk by being released the call during servicing the current call in the trunk group, in case that there is no idle trunk in the trunk group; and resetting a recovered trunk ID as the idle trunk standby information.

12. The method of claim 7, wherein allocating the standby trunk further comprises:

supervising whether there is a generated trunk by being restored a failure trunk, or/and by being added a new trunk in the trunk group, in case that there is no idle trunk in the trunk group; and resetting a generated trunk ID as the idle trunk standby information.

13. The method of claim 7, wherein allocating the standby trunk further comprises processing the current call service through the allocated trunk after storing the idle trunk standby information in the trunk group table.

14. A method for searching trunks in an exchange system having a distributed control structure for distributing the trunks to a plurality of switching subsystems, comprising:

searching whether there is an idle trunk in a trunk group by reading a trunk group table in accordance with a trunk allocation request;

setting information of a searched idle trunk as an idle trunk information for a current call service in case that there is the idle trunk in the trunk group;

searching another idle trunk in the trunk group for being used to the next trunk allocation request;

setting information of another searched idle trunk as an idle trunk standby information in case that there is another idle trunk in the trunk group, and storing the idle trunk standby information in the trunk group table; and processing the current call service through the searched idle trunk by using the idle trunk information.

15. The method of claim 14, wherein searching whether there is the idle trunk comprises:

reading a preset idle trunk standby information stored in the trunk group table; and determining whether there is the idle trunk in the trunk group according to the preset idle trunk standby information.

16. The method of claim 14, wherein the idle trunk standby information is a search pointer (SCHP) of instructing whether there is the idle trunk in the trunk group, and the SCHP is set as an identified number (ID) of the idle trunk.

17. The method of claim 16, wherein the SCHP is set a default value excepting trunk IDs as the idle trunk information and the idle trunk standby information in case that there is no trunk having idle and normal state in the trunk group during searching processes.

18. The method of claim 14, wherein searching whether there is the idle trunk further comprises:

identifying whether there is the next switching subsystem in the same trunk group, in case that there is no idle trunk in the trunk group; and moving the call processing service to the next switching subsystem immediately.

19. The method of claim 14, wherein searching another idle trunk comprises:

supervising whether there is a recovered trunk by being released the call during serving the current call in the trunk group, in case that there is no idle trunk in the trunk group; and resetting a recovered trunk ID as the idle trunk standby information.

20. The method of claim 14, wherein searching another idle trunk further comprises:

supervising whether there is a generated trunk by being restored a failure trunk, or/and by being added a new trunk in the trunk group, in case that there is no idle trunk in the trunk group; and resetting a generated trunk ID as the idle trunk standby information.

21. The method of claim 1, wherein searching the standby idle trunk comprises:

increasing a SCHP of the idle trunk standby information to search state of the next trunk for being used when the next cell is requested;

determining whether the next trunk state is idle of normal by checking a call state of the next trunk as increasing one by one from the next trunk;

setting an ID of the next trunk as the SCHP, in case that the next trunk state is idle and normal.

* * * * *